United States Patent [19]

Saito et al.

[11] Patent Number: 4,831,525
[45] Date of Patent: May 16, 1989

[54] METHOD OF GENERATING A SOURCE PROGRAM FROM INPUTTED SCHEMATIC INFORMATION

[75] Inventors: Kazumasa Saito, Aso; Hiroyuki Maezawa, Sagamihara; Masakazu Kobayashi, Ota; Yoshihiko Futamura, Hachioji, all of Japan

[73] Assignee: Hitachi, Ltd., Tokyo, Japan

[21] Appl. No.: 145,410

[22] Filed: Jan. 19, 1988

Related U.S. Application Data

[63] Continuation of Ser. No. 695,229, Jan. 28, 1985, abandoned.

[30] Foreign Application Priority Data

Jan. 30, 1984 [JP] Japan .................................. 59-13461

[51] Int. Cl.$^4$ .............................................. G06F 1/00
[52] U.S. Cl. ..................................................... 364/300
[58] Field of Search ......................................... 364/300

[56] References Cited

U.S. PATENT DOCUMENTS

| | | | |
|---|---|---|---|
| 4,389,706 | 6/1983 | Gomola et al. | 364/130 |
| 4,517,652 | 5/1985 | Bennett | 364/513 |
| 4,533,997 | 8/1985 | Furgerson | 364/200 |
| 4,534,012 | 8/1985 | Yokozawa | 364/900 |
| 4,536,840 | 8/1985 | Borta | 364/300 |
| 4,555,619 | 6/1984 | Masui et al. | 364/900 |
| 4,558,413 | 12/1985 | Schmidt et al. | 364/300 |

FOREIGN PATENT DOCUMENTS 2941824 4/1980 Fed. Rep. of Germany .
2127188 4/1984 United Kingdom .

Primary Examiner—Raulfe B. Zache
Attorney, Agent, or Firm—Antonelli, Terry & Wands

[57] ABSTRACT

According to the present invention, using a display terminal for conversation, a module structure diagram (schemata expressive of the connectional relations among respective program modules) is created, and a processing flow diagram (a kind of processing flow chart), an internal data definition diagram (schemata for specifying the formats etc. of data for use in processes) and an interface data definition diagram (schemata for specifying the formats etc. of arguments, common data between the modules, etc.) are created for each module, the created contents being stored in a memory. Further, the schematic information items of the module structure diagram, processing flow diagram, internal data definition diagram and interface data definition diagram are read out from the memory for each module and have stereotyped sentences and symbols added thereto, to generate the individual sentences of a source program. These sentences are edited according to the rules of a language, to complete the source program. If necessary, the various diagrams are printed out and utilized as program specifications.

25 Claims, 10 Drawing Sheets

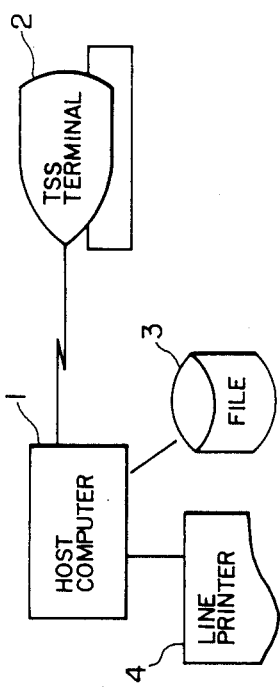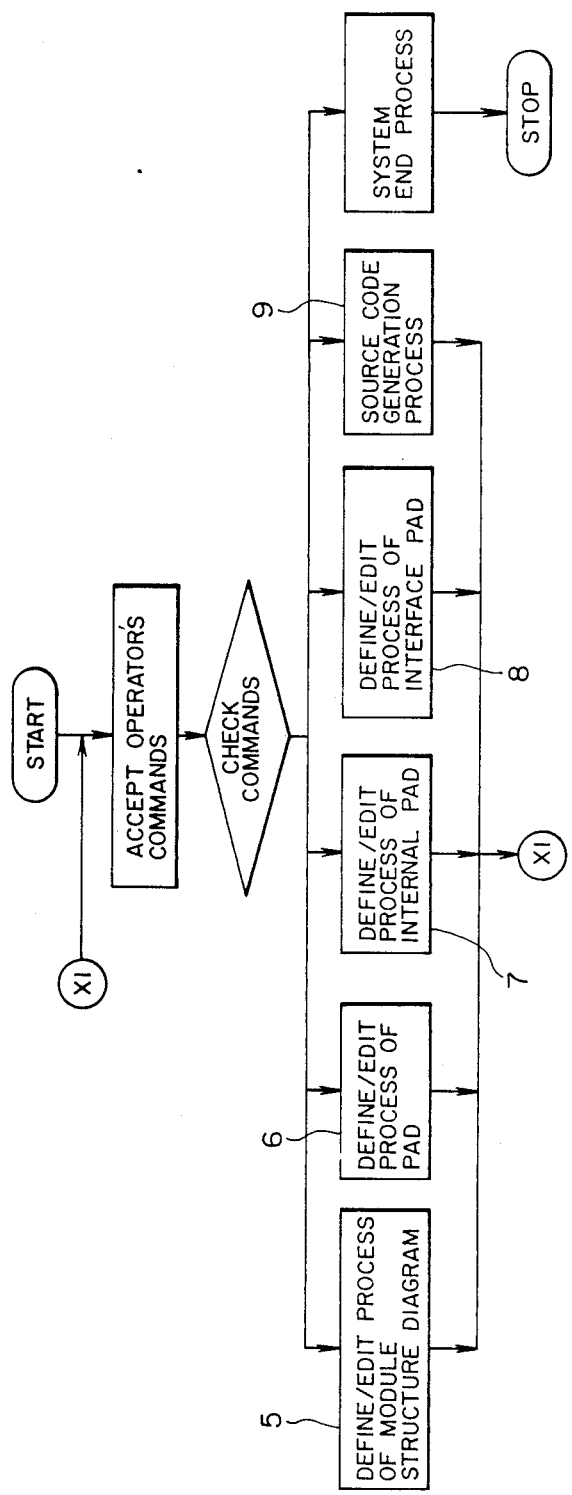

METHOD OF GENERATING A SOURCE PROGRAM FROM INPUTTED SCHEMATIC INFORMATION

This is a continuation Ser. No. 695,229, filed Jan. 28, 1985, now abandoned.

BACKGROUND OF THE INVENTION

1. Field of the Invention

The present invention relates to an apparatus for automatically creating a source program, and more particularly to a method in which the operations of such apparatus from the creation of the specifications of a program to the coding of the source program are automatically performed.

2. Description of the Prior Art

Heretofore, a source program has been generated by a programmer who first creates the specifications of a program and then writes the program on a coding sheet on the basis of the specifications, whereupon a puncher or the like records information on a recording medium, such aspunched card, or inputs it directly from a keyboard at a terminal. With such a method, parts preset for a programming language, for example, key words, separators and letters for continuation also must be manually coded and then punched or keyed. The manual processing of such stereotyped parts is a waste of time, and often leads to mistakes. Further, much labor is required for the amendments and addition of program specifications which occur frequently.

SUMMARY OF THE INVENTION

An object of the present invention is to significantly reduce the burden necessary for the creation of a source program and simultaneously prevent the descriptive mistakes of parts usual for a language and to make it possible to utilize various schemata of intermediate products as program specifications, thereby improving the efficiency of the operation for creating the source program.

The present invention for accomplishing the above object consists in a method for an information processing system having a computer, and a memory unit and a display terminal which are connected to the computer, characterized by the step of inputting from said display terminal various schematic information on a program module structure diagram as well as processing flow diagrams, internal data definition diagrams and interface data definition diagrams which correspond to respective modules, the step of reading out source sentences corresponding to the schematic information from said memory unit and generating the individual source sentences for each of the respective modules, and the step of editing the source sentences and generating a source program.

BRIEF DESCRIPTION OF THE DRAWINGS

FIG. 1 is a block diagram showing an example of a system arrangement for performing the present invention;

FIG. 2 is a general flow chart of processing according to the present invention;

DESCRIPTION OF THE PREFERRED EMBODIMENTS

Figure 3:
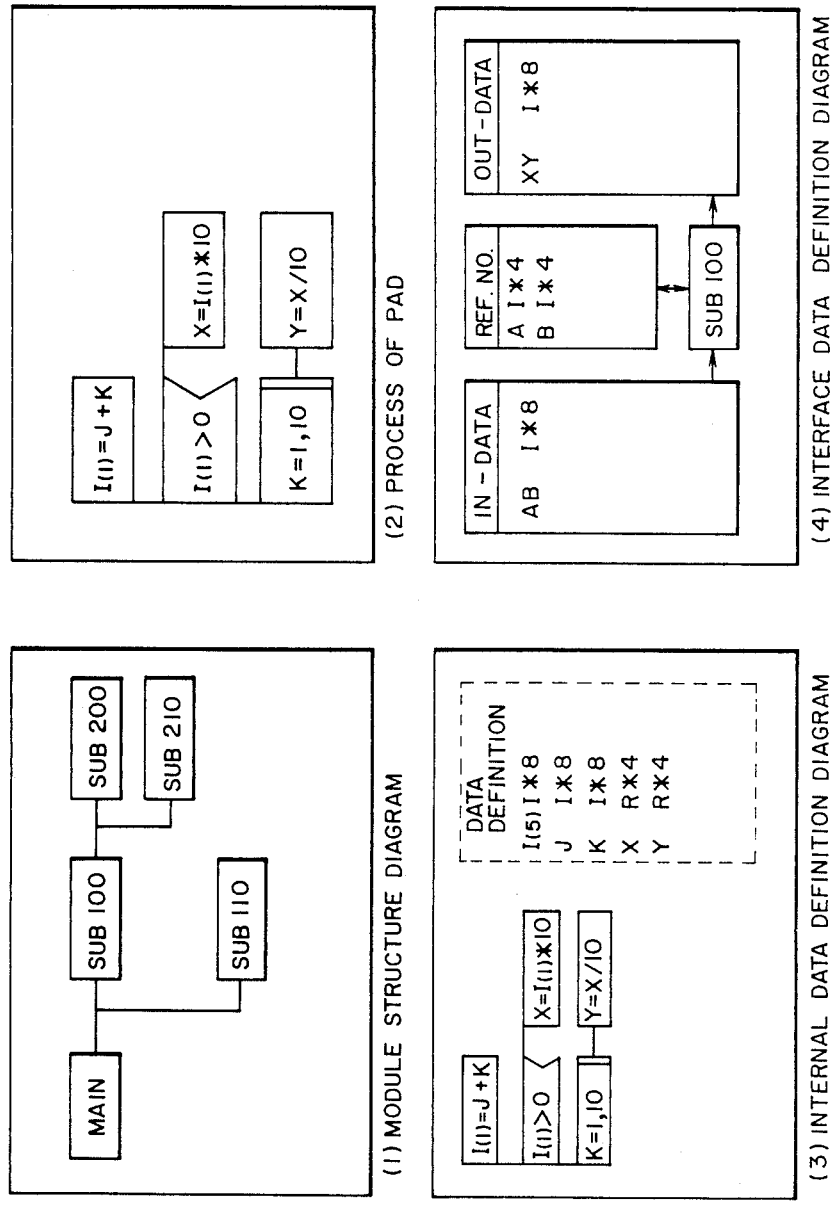
FIGS. 3(1)–3(4) are diagrams for explaining the display picture formats of respective schematic specifications.

FIG. 1 shows an example of a system arrangement for performing the present invention. Numeral 1 designates a host computer which processes various sorts of information, numeral 2 a TSS terminal which includes a keyboard and a graphic display unit and which communicates with the host computer 1 through a proper circuit in conversational fashion, numeral 3 a file which stores schematic specification information created or modified by the use of the TSS terminal 2, and numeral 4 a line printer for output.

FIG. 2 depicts as a flow chart the outline of a process which the host computer 1 performs in accordance with the present invention. he process is dividedly executed as a process 5 for defining or editing a module structure diagram in accordance with operator's commands, a process 6 for defining or editing a processing flow diagram, a process 7 for defining or editing internal data, a process 8 for defining or editing interface data, and a process 9 for generating source codes. Among the processes, those processors 5–8 are executed by conversational operations resorting to the keyboard and the graphic display unit of the TSS terminal 2. It is FIGS. 3(1)–3(4) that exemplify the formats on a display screen, of respective schematic specifications created by the processes 5–8.

FIG. 3(1) is the module structure diagram, and it depicts the interconnections of the individual modules of a source program to be generated. The illustrated examples indicates that a module 10 named 'MAIN' is calling a module 11 named 'SUB 100' and a module 12 named 'SUB 110', and that the module 'SUB 100' is calling modules 13 and 14 named 'SUB 200' and 'SUB 210'. FIG. 3(2) is the processing flow diagram, and it depicts the logical flow of processes in each module. The illustrated example is shown by the use of a known PAD (problem analysis diagram). The PAD expresses the flow of the processes by the connections of three sorts of boxes. The box of a simple rectangle denotes a sequential process, the box of a rectangle whose right end is notched denotes executing the process of a box connected to the right upper or left lower corner thereof in accordance with a select condition, and the box of a rectangle which has a vertical line inserted in its right end part denotes the repeated execution of the process of a box connected to the right side thereof. The example of FIG. 3(2) indicates that a step 15 of substitution 'I(1)=J+K' is executed, that if a condition 16 of 'I(1) >0' is met, a process 17 of 'X=I(1)*10' is executed; otherwise no process is executed, and that a process step 18 of 'Y=X/10' is subsequently repeated 10 times under a repetition condition 18 of 'K=1, 10'. In this manner, the PAD expresses the flow of processes as two-dimensional schemata, and the sequence of execution is so set that the processes proceed downwards from above in principle and rightwards subject to conditions. Therefore, the PAD is an expedient and effective means for visually expressing the logic structures of processes, such as the unification of the processes, the sequence of execution, and the depths of repetition and check.

FIG. 3(3) is an internal data definition diagram, and it defines the arrayal numbers, types etc. of data for use in the processes in the aforementioned PAD. The illustrated example corresponds to a case of expressions by the FORTRAN language. For example, in an expression 'I(5)I*8', 'I' denotes a variable name, '(5)' denotes the arrayal number, and 'I*8' denotes data of INTEGER (integer type) and 8 bytes. FIG. 3(4) is an interface data definition diagram. Regarding arguments for calling modules and common data to be referred to or updated between modules, it defines the variable names, types, arrayal numbers etc. of data similarly to the internal data within boxes 20-22 indicated at 'ARGUMENT', 'IN-DATA' and 'OUT-DATA' respectively.

Figure 4:
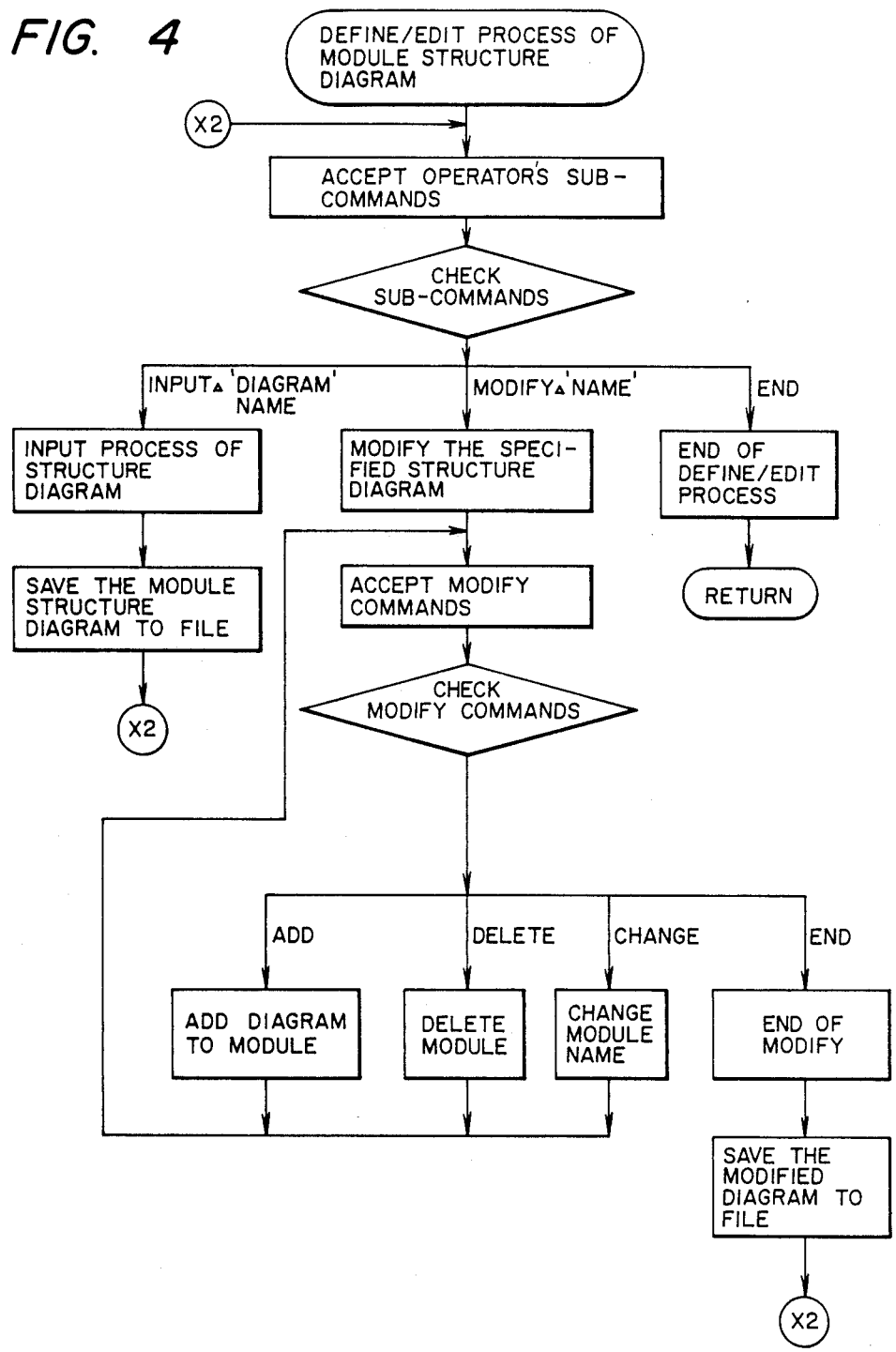
FIG. 4 is a flow chart of the define/edit process of a module structure diagram.

FIG. 4 is a flow chart showing the contents of the define/edit process of the module structure diagram (the process 5 in FIG. 2) more in detail. In accordance with sub-commands which an operator inputs, the processes of 'INPUT' (input), 'MODIFY' (modification) and 'END' (end) are performed. In the case of 'MODIFY' , the processes of 'ADD' (addition, 'DELETE' (deletion), 'CHANGE' (change) and 'END' (modify mode end) are performed by subordinate modify commands.

Figure 5:
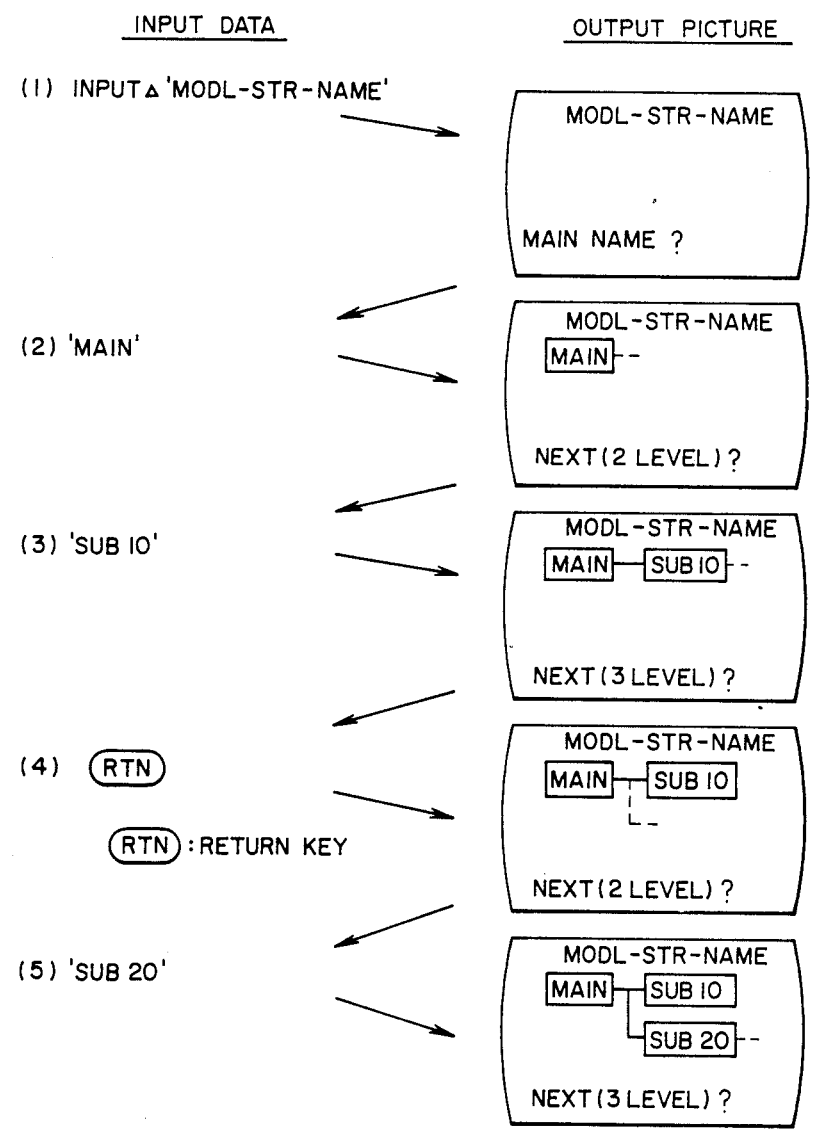
FIG. 5 is a process diagram of a module structure diagram-inputting portion in FIG. 4.

FIG. 5 shows the details of a 'new creation' process portion in the 'INPUT' process in FIG. 4. In the figure, 'INPUT DATA' denotes information which the operator inputs by keying on each occasion, and 'OUTPUT PICTURE' the status of a picture which is indicated on the display unit in response to the corresponding input operation. The operations proceed as indicated by the arrows. A small triangle in 'INPUT DATA' is a space. Since the control method of equipment for realizing such operations is well known, it shall not be explained. The contents of the several 'MODIFY' processes are basically similar to the above.

Figure 6:
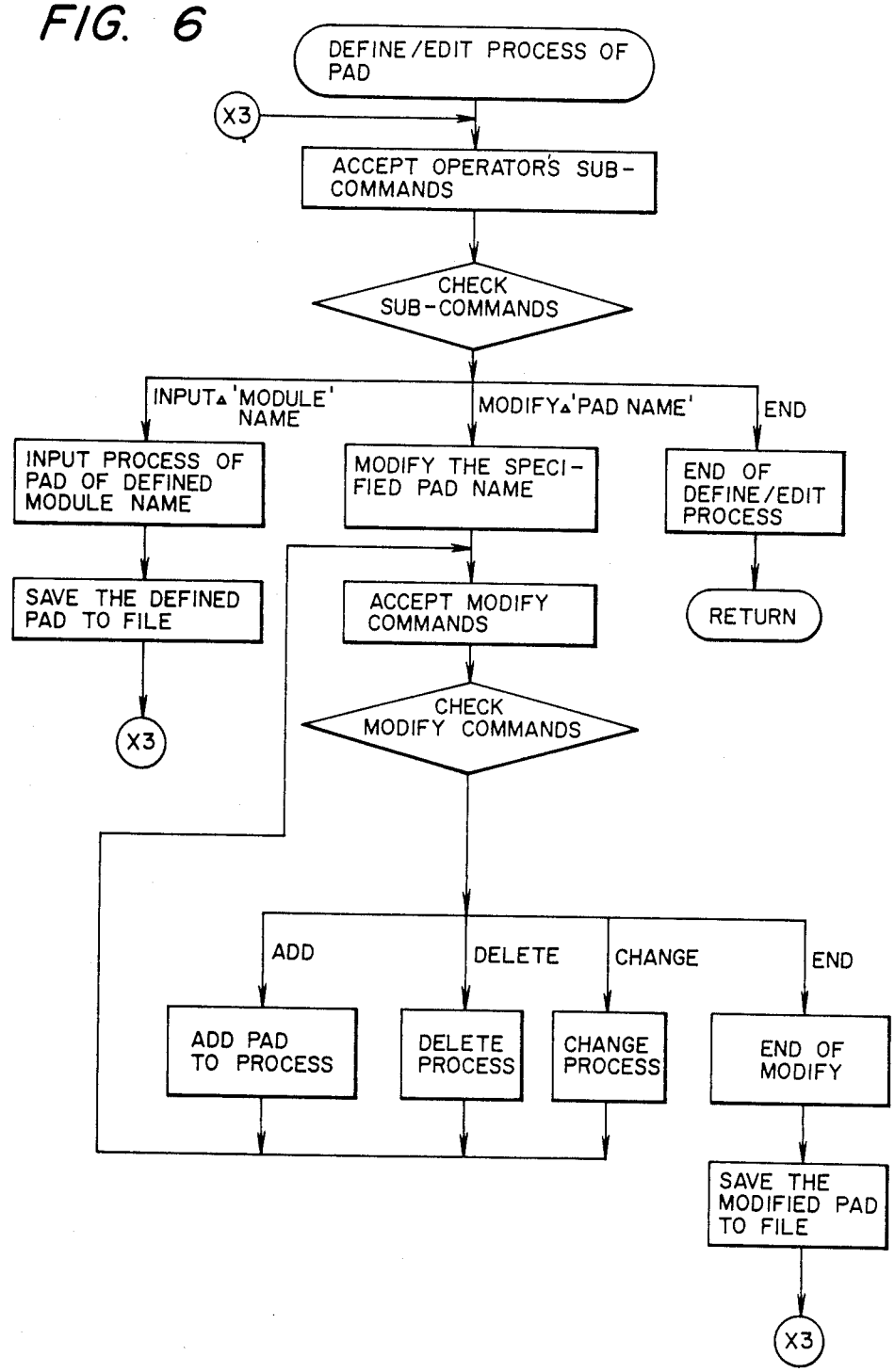
FIG. 6 is a flow chart of the define/edit process of a problem analysis diagram.

FIG. 6 is a flow chart showing the contents of the define/edit process of the processing flow diagram (the process 6 in FIG. 2) more in detail. It includes commands similar to those in the case of the define/edit process of the module structure diagram in FIG. 4, and the whole chain is the same as that case.

Figure 7:
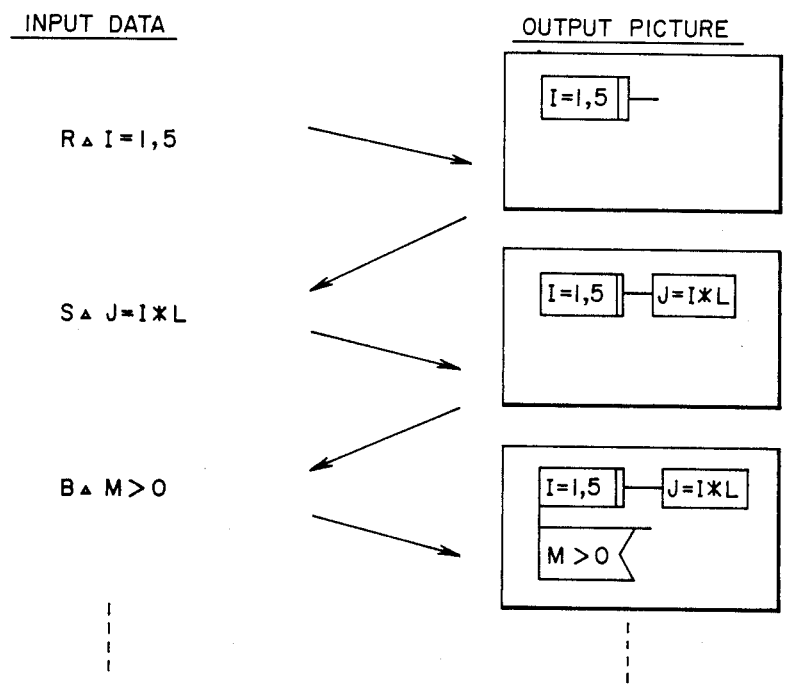
FIG. 7 is a process diagram of a problem analysis diagram-inputting portion in FIG. 6.

FIG. 7 shows the details of a 'new creation' process portion in the 'INPUT' process in FIG. 6, and the form of expression thereof is the same as in FIG. 5. In the input data, however, 'R' indicates a repeated execution process in the PAD, 'S' a sequential process, and 'B' a branch process.

Figure 8:
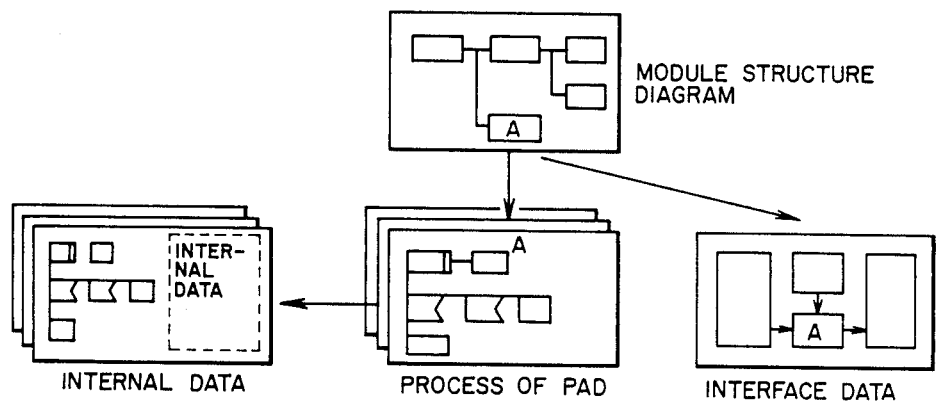
FIG. 8 is a conceptual diagram showing the relations among schemata.

FIG. 8 shows the relations of various schemata. In the illustrated example, the processing flow diagram and the interface data definition diagram are created for a module named 'A' among modules in the module structure diagram. The processing flow diagram need not be contained within one picture, but it can extend over a plurality of pictures. The internal data definition diagram is created for each processing flow diagram.

Figure 9:
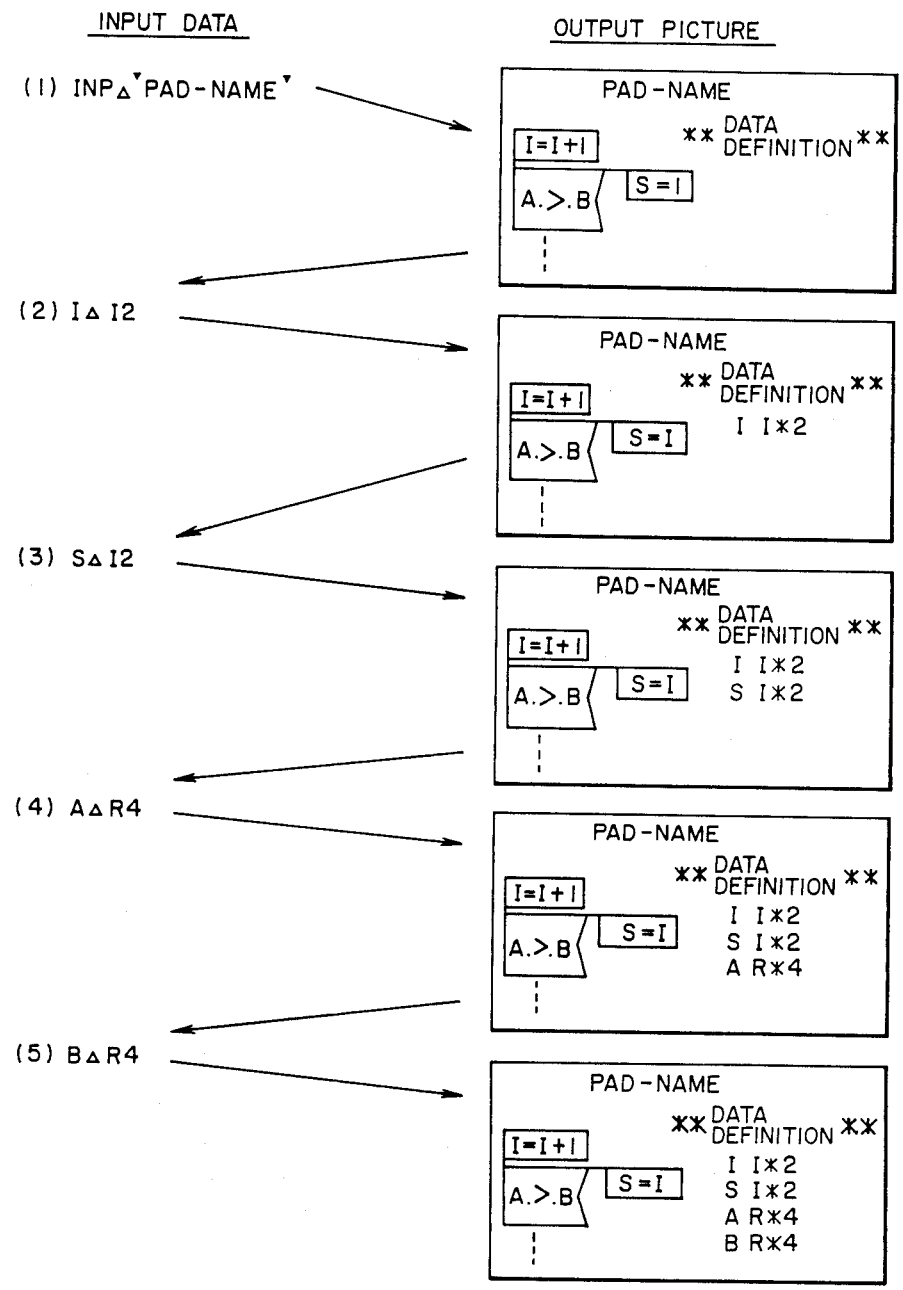
FIG. 9 is a process diagram of the inputting of an internal data definition diagram.
Figure 10:
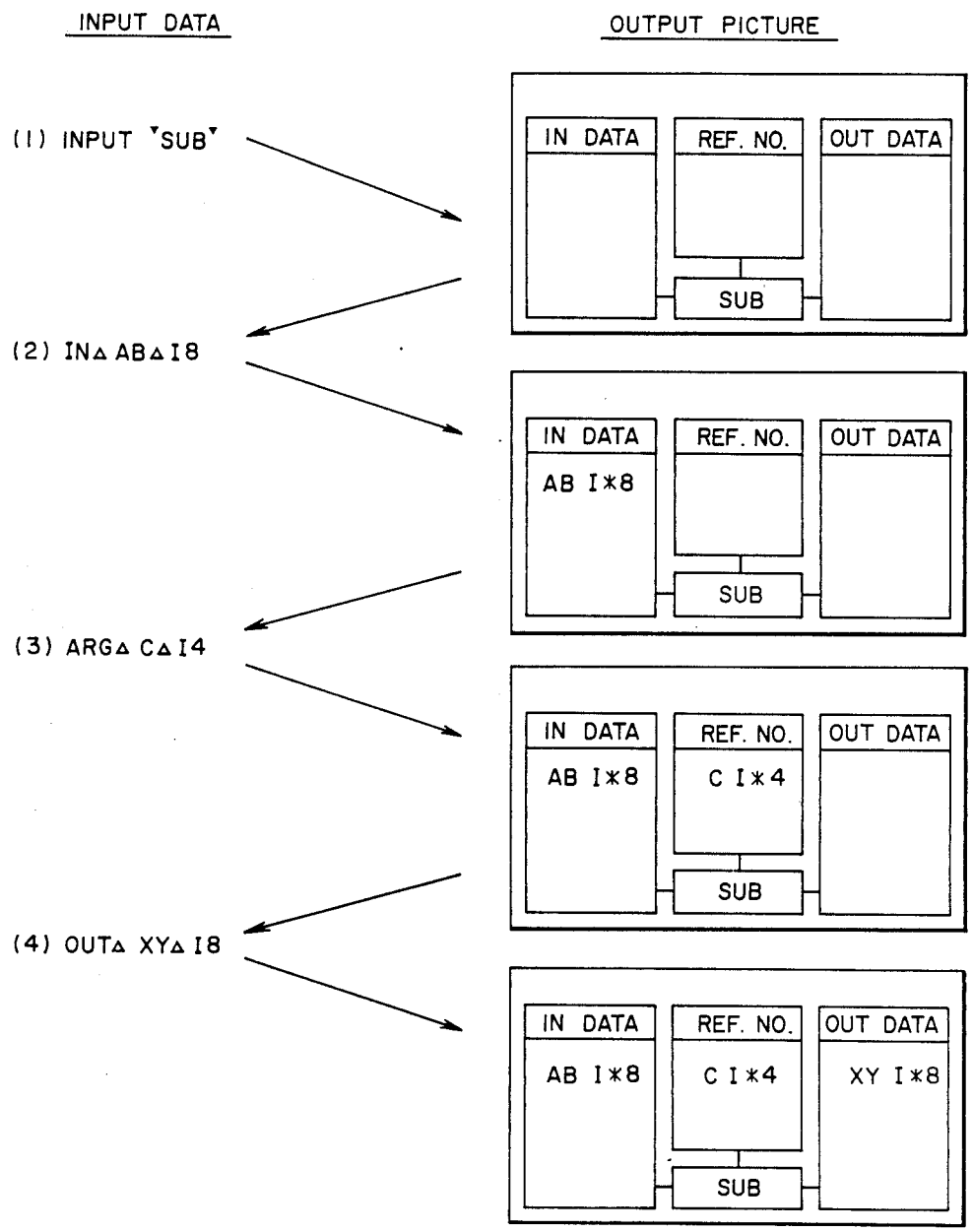
FIG. 10 is a process diagram of the inputting of an interface data definition diagram.

The contents of the define/edit processes of the internal data definition diagram and the interface data definition diagram are basically the same as in the processing flow diagram of FIG. 6. The command chains of the former diagrams are similar to that of the latter diagram. That is, the names, types, arrayal numbers etc. of data are defined according to an 'INPUT' command from the TSS terminal 2, while they are added changed and deleted according to a 'MODIFY' command. FIGS. 9 and 10 show the details of 'new creation' process portions in the 'INPUT' processes of the internal data definition diagram and the interface data definition diagram, respectively, in the same form as in FIG. 5.

The module structure diagram, processing flow diagram, internal data definition diagram and interface data definition diagram are created as described above, and the schematic information thereof is stored in the file 3. Thereafter, a source program is automatically created by a source code generation process. The outline of this source code generation process is illustrated in a flow chart in FIG. 11. When the operator specifies from the keyboard the name of the module structure diagram (Steps S1-S3) to generate a source code and a desired source code language (FORTRAN, PL/1, PL/M or the like), the schematic information items of the processing flow diagram, internal data definition diagram and interface data definition diagram corresponding to the respective modules of the specified module structure diagram are read out from the file 3 (Step S4), and the source code is generated on the basis of the information items (Steps S5 and S6).

Figure 12:
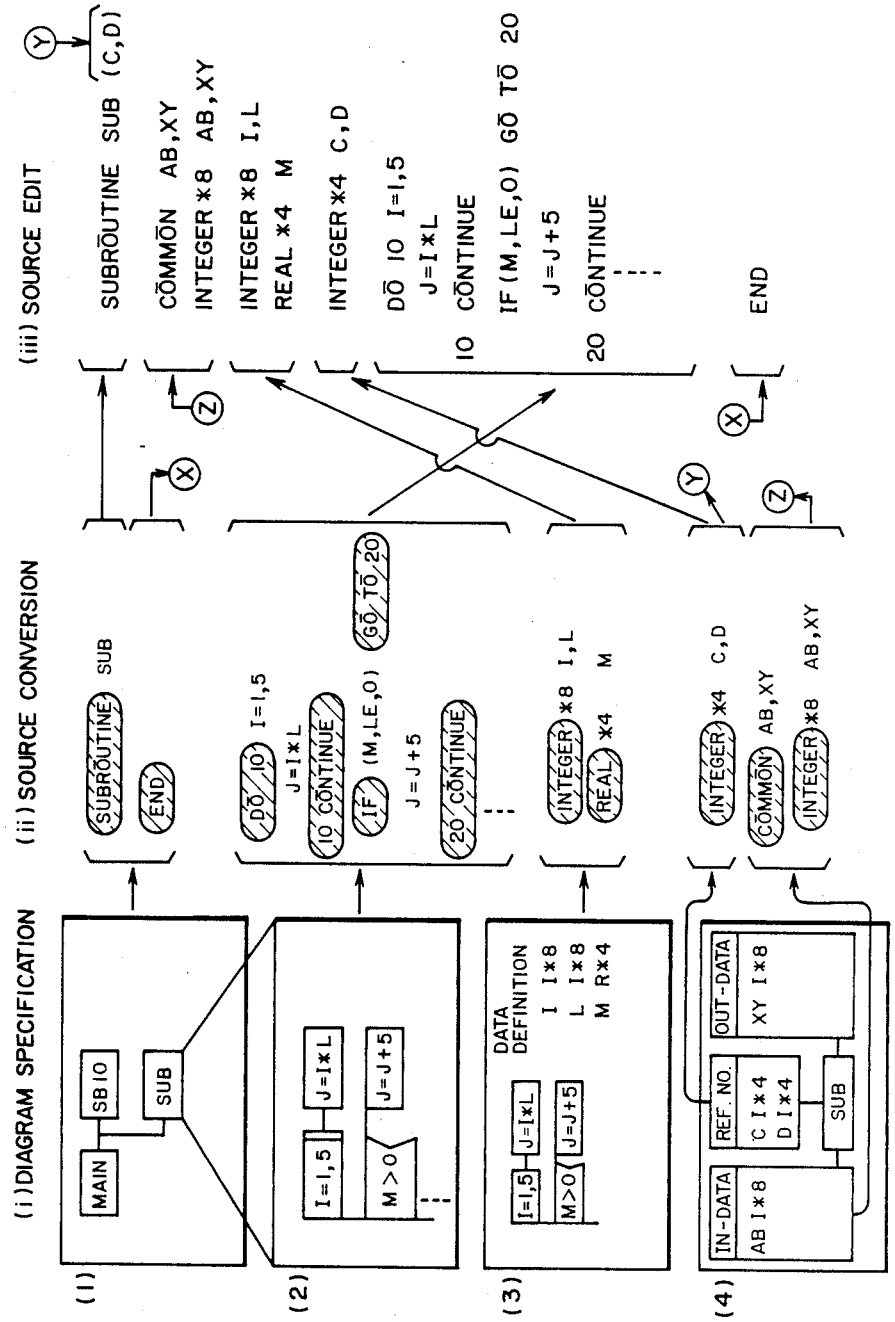
FIG. 12 is a process diagram of a source code converting portion in FIG. 11.

FIG. 12 shows a procedure in which the source code is generated from the schematic information items. In the figure, it is assumed that as to the module 'SUB' in the module structure diagram indicated at (1) in (i) schema specifications, the corresponding (2) processing flow diagram, (3) internal data definition diagram and (4) interface data definition diagram are defined as shown, and that a source program described in FORTRAN is created from the diagrams. The creation process consists broadly of the two stages of (ii) source conversion and (iii) source edition.

As the first stage, individual source sentences are generated from (1)-(4) of the schematic information (i) by the source conversion process (ii) as indicated by arrows. In the figure, framed and hatched parts are automatically added, and they are sentences, symbols etc. previously determined according to descriptive rules peculiar to the specified programming language. In the illustrated example, process sentences 'DO' , 'CONTINUE', 'IF etc. and key words 'INTEGER', 'REAL', 'COMMON' etc. for defining the types of data conform to the descriptive rules of the FORTRAN language.

As the second stage, the various source sentences obtained at the first stage are rearranged in order so as to form one program unit and according to the descriptive rules of the specified programming language by the source edition process (iii). In the case of FORTRAN, one compile unit extends from 'SUBROUTINE' to 'END', between which the definitions of the types of the data are placed at the head and are followed by the process sentences in accordance with the descriptive rules, whereby the source program of the module 'SUB' is completed. In the figure, arrows indicate where the respective source sentences are shifted by the source edition.

In the course of the source code generation process, whether or not all of the processing flow, the internal data and the interface data have been defined is checked. When they have not been defined, a message to that effect is indicated on the display unit so as to inform the operator of the situation.

Figure 11:
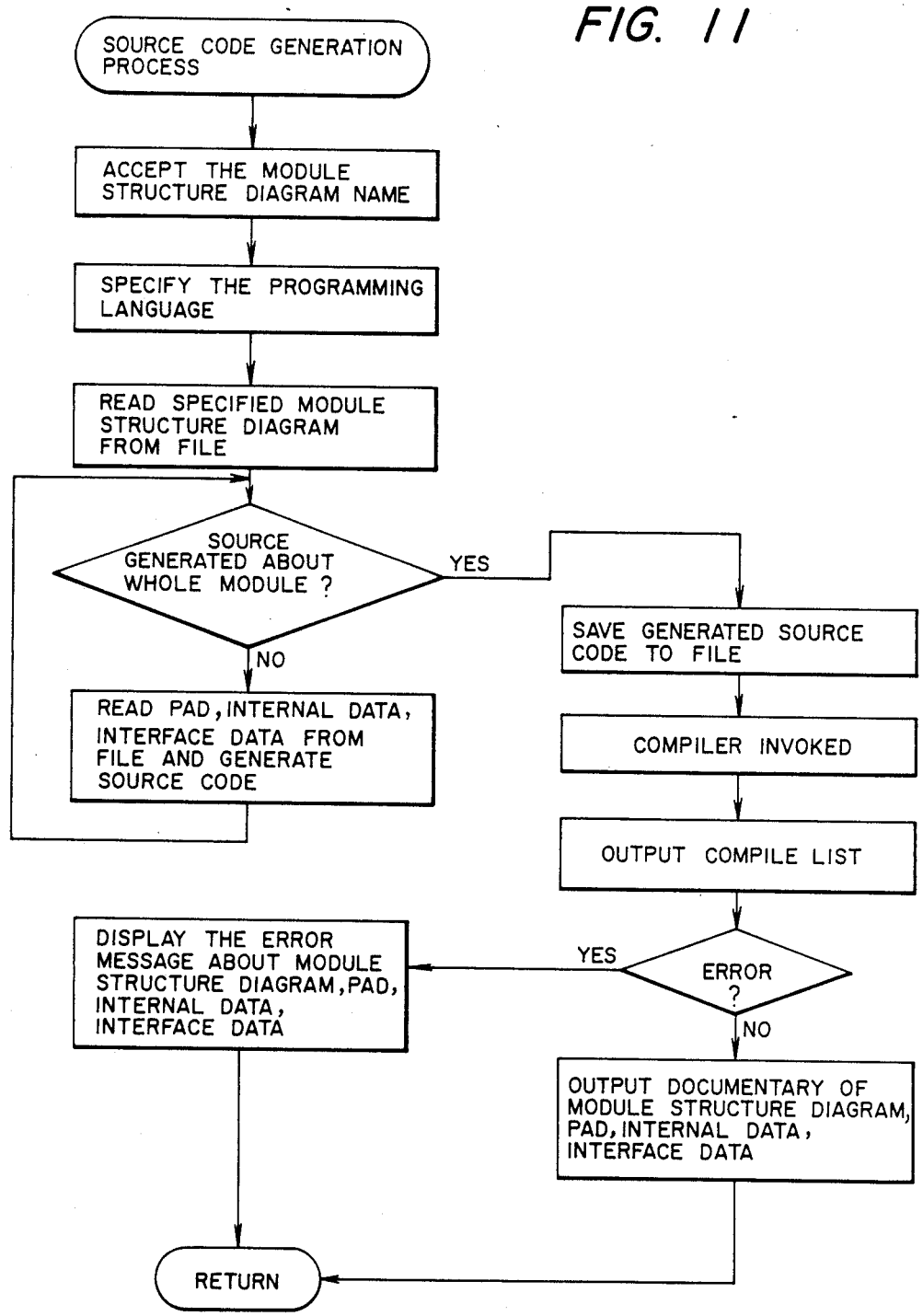
FIG. 11 is a flow chart of a source code generation process.

The generated source code is once saved in the proper file (Step S7 of FIG. 11). Thereafter, it is read out and is applied to a compiler (Step S8), and the compiled result is provided as an output (Step S9). In the presence of a compilation error at this time (Step S10), an error message is displayed in the corresponding place of the previously crated module structure diagram, processing flow diagram, internal data definition diagram or interface data definition diagram on the display unit, instead of displaying the compiled list (Step S11). When the error has been pointed out in this way, the operator commands the 'MODIFY' process for the corresponding schema, modifies the schema with a suitable modifying command (refer to FIGS. 4 and 6) and causes the system to perform the source code generation process again.

When there is no compilation error and the various schematic information items created are used as program specifications, they are outputted (Step S12) and printed out by the line printer.

As set forth above, according to the present invention, schema specifications completed in conversational fashion by an operator are filed, and a source program is automatically created, so that labor for the program creation can be significantly reduced and that careless mistakes can be avoided. In addition, it is possible to automatically check the insufficiency and errors of specifications in the course of the automatic creation of the program and to print out a clean copy of schema specifications by means of a machine. Further, the source program and the specifications are unitary at all times, and the disagreement between them does not occur.

We claims:

1. In an information processing system having a computer and a display terminal connected to the computer; a method of automatically generating a source program comprising the step of inputting through said display terminal various schematic information items representing a program module structure diagram as well as processing flow diagrams, internal data definition diagrams and interface data definition diagrams which correspond to respective modules, the step of generating source sentences for the respective modules based on inputted schematic information items, and the step of editing the source sentences and generating a source program.

2. A method of automatically generating a source program as defined in claim 1, further comprising the step of defining or/and editing at least one of said schematic information items.

3. A method of automatically generating a source program as defined in claim 1, wherein, when a source sentence of a predetermined specific symbol string is generated, a symbol string is automatically generated simultaneously.

4. A method of automatically generating a source program as defined in claim 1, wherein at least one of said flow diagrams is a problem analysis diagram.

5. A method of automatically generating a source program as defined in claim 2, wherein, when the module structure diagram is edited, a process for addition to the module, a process for deletion from the module and a process for change of a module name are performed.

6. A method of automatically generating a source program as defined in claim 2, wherein, when one of said processing flow diagrams is edited, the steps of addition to said one processing flow diagram, deletion therefrom and change of process therein are performed.

7. A method of automatically generating a source program as defined in claim 1, further comprising the step of specifying a programming language of the source sentences.

8. In an information processing system having a processor, and a display unit connected to the processor; a method of automatically generating a program comprising the steps of: inputting information specifying a program structure comprising a number of modules to be generated and generating a diagram of said program structure on said display unit by said processor; inputting information specifying operations to be performed and a flow of said operation within each program modules which is a member of said module structure diagram and generating a processing flow diagram on said display unit by said processor; identifying common data of a plurality of said modules for processing each of said modules; generating program statements from said module structure diagram and said processing flow diagram based on said common data; adding statements to or deleting statements from said generated program statements, based on at least a syntax of said program; and editing said generated program statements and said added statements based on said syntax of said program.

9. A method of automatically generating a program according to claim 8, wherein said module structure diagram and said processing flow diagram are schematic diagrams and are interactively generated by use of said display unit.

10. A method of automatically generating a program according to claim 8, wherein said processing flow diagram is a two dimensional flow diagram.

11. A method of automatically generating a program according to claim 8, wherein said method further comprises the set of defining internal data of said processing flow diagram.

12. A method of automatically generating a program according to claim 8, wherein said step of identifying common data further includes the step of defining data which is given from a module to another module.

13. A method of automatically generating a program according to claim 8, wherein said program to be generated is a source program.

14. A method of automatically generating a program as defined in claim 8, wherein said processing flow diagram is generated as a string of predetermined specific symbols.

15. A method of automatically generating a program as defined in claim 8, wherein the processing flow diagram is a problem analysis diagram.

16. A method of automatically generating a program as defined in claim 8, wherein, when the module structure diagram is edited, a process for addition to the module, a process for deletion from the module and a process for change of a module name are performed.

17. A method of automatically generating a program as defined in claim 8, wherein, when the processing flow diagram is edited, the steps of addition to the processing flow diagram, deletion therefrom and change of a process therein are performed.

18. A method of automatically generating a program as defined in claim 8, comprising the step of specifying a programming language of said program statements to be generated.

19. A method of generating a source program in an information processing system having a processing means and a memory means, comprising the steps of storing into said memory means various schematic information items including a structure of program modules, processing flow, internal data definition and interface data definition; inputting the schematic information items from said memory means to said processing means; generating individual source sentences form said individual inputted schematic information items by the processing means; and editing source sentences to generate the source program by the processing means.

20. A method of generating a source program in an information processing system having processing means and memory means comprising:
storing into said memory means various schematic information items including a structure of program modules, processing flow, internal data definition and interface data definition;
inputting the schematic information items from said memory means to said processing means; and
generating the source program based on inputted schematic information items in said processing means.

21. A method of generating a source program according to claim 20, wherein said information processing system further includes a display terminal, the method further comprising the step of editing said schematic information items to be stored in said memory means by conversational operations through said display terminal.

22. A method of generating a source program according to claim 20, wherein said generating step includes the step of generating individual source sentences based on the inputted schematic information items and the step of generating the source program by editing the generated source sentences.

23. A method of generating a source program in an information processing system having processing means and memory means, comprising:
storing into said memory means various schematic information items including a structure of program modules, processing flow data, internal data definition data which defines information used in each module and interface data definition data which defines information between modules;
inputting the schematic information items from said memory means to said processing means; and
generating the source program based on inputted schematic information items in said processing means.

24. A method of automatically generating a source program as defined in claim 1, wherein said information processing system includes a memory and said step of inputting said various schematic information items includes a step of editing said schematic information items through said display terminal and a step of storing edited schematic information items in said memory.

25. A method of generating a source program in an information processing system having a processing means and an inputting means, comprising steps of: inputting various schematic information items, including a structure of program modules, processing flow, internal data definition and interface data definition, from said inputting means to said processing means; generating individual source sentences from inputted schematic information items by the processing means; and editing said source sentences to generate a source program by the processing means.

* * * * *